United States Patent
Raetz et al.

[11] Patent Number: 5,985,149
[45] Date of Patent: Nov. 16, 1999

[54] BIOREMEDIATION SYSTEM

[76] Inventors: Richard M. Raetz, 1235 Woodmere, Traverse City, Mich. 49686; Al E. Tester, 8552 W. Milligan Rd., Brimley, Mich. 49715

[21] Appl. No.: 08/762,163

[22] Filed: Dec. 9, 1996

Related U.S. Application Data

[60] Provisional application No. 60/008,374, Dec. 8, 1995.
[51] Int. Cl.⁶ .................................................. C02F 3/02
[52] U.S. Cl. ..................... 210/617; 166/246; 210/610; 210/614; 210/622; 210/747; 210/143; 210/150; 210/170; 210/195.1; 210/196; 405/128; 435/262.5; 435/299.1
[58] Field of Search .............................. 166/246; 210/610, 210/614, 617, 618, 622, 623, 624, 747, 143, 150, 151, 170, 195.1, 196; 435/299.1, 262.5; 405/128

[56] References Cited

U.S. PATENT DOCUMENTS

| | | | |
|---|---|---|---|
| 3,855,120 | 12/1974 | Garbo | 210/617 |
| 4,009,099 | 2/1977 | Jeris | 210/151 |
| 4,860,959 | 8/1989 | Handleman | 241/39 |
| 5,043,283 | 8/1991 | Endo et al. | 435/286 |
| 5,240,600 | 8/1993 | Wang et al. | 210/188 |
| 5,487,829 | 1/1996 | Safferman et al. | 210/151 |
| 5,573,671 | 11/1996 | Klein | 210/617 |
| 5,578,210 | 11/1996 | Klecka | 210/610 |
| 5,750,028 | 5/1998 | Frisch | 210/618 |
| 5,833,857 | 11/1998 | Roth | 210/610 |

*Primary Examiner*—Peter A. Hruskoci
*Attorney, Agent, or Firm*—Waters and Morge, P.C.

[57] ABSTRACT

A bioremediation process employing an improved bioreactor comprises pumping contaminated ground water from a recovery well in a contamination site, passing the water through a fully pressurized bioreactor wherein the water is enriched with nutrients and oxygen and treated with microorganisms native to the contamination site, and returning the enriched and treated water and microorganisms in a finely dispersed state to the contamination site, thereby enhancing bioremediation in a subsurface bioactive zone. The recirculation is accomplished with only the recovery well pump. The bioreactor is a fully pressurized fluidized bed bioreactor. The bioreactor includes a recirculation loop driven by a fluidization pump. The loop has a first branch that returns a portion of the recirculating water directly to the bioreactor inlet. A second branch of the recirculation loop includes a venturi/shearing nozzle driven by the fluidization pump that siphons biomass and attached particulate solids from an upper portion of the bioreactor and shears the biomass from the particulate solids and breaks up the biomass into fine particles. The fine particles pass through the bioreactor and outlet filter and well screen and are returned along with treated ground water to the contamination site. Computer controls provide a means for monitoring and adjusting operation from a remote location. Passive sparge and vent wells contribute to the in place bioremediation as well as serve to strip and remove volatile contaminants from the contamination site.

12 Claims, 6 Drawing Sheets

BIOREMEDIATION SYSTEM

CROSS-REFERENCES TO RELATED APPLICATIONS

This is a continuing application of co-pending U.S. patent application Ser. No. 60/008,374, entitled Bioremediation System and filed on Dec. 8, 1995, by Richard M. Raetz, the disclosure of which is incorporated here by reference.

BACKGROUND OF THE INVENTION

The invention generally relates to bioremediation and more particularly relates to extraction and processing of ground water from a contaminated area in a pressurized bioreactor and reinjection of the treated water back into the contaminated area along with oxygen, nutrients, and finely dispersed native microorganisms.

A number of systems and processes have been developed for remediating subsurface soil and ground water that have been contaminated with hydrocarbons or other organic compounds. Early efforts involved prohibitively expensive excavation of contaminated soil. In situ processes include removal of contaminated ground water by pumping, cleaning the water by above ground treatment, and reintroducing the water into the ground water.

Bioremediation involves the use of biological media to decompose organic compounds. This can occur in situ or above ground and can use naturally occurring or specially cultured biological media. Above ground vessels in which biological treatment of ground water is undertaken are called bioreactors. The use in remediation of microorganisms that are naturally occurring or native to the area of the contamination is believed to be advantageous, because the native microorganisms are already adapted to the soil conditions and the contaminants. The challenge is to stimulate the proliferation of these naturally occurring microorganisms and provide a compatible environment for biological action on the contaminants. Without assistance, natural biological breakdown of contaminants in the soil can take an undesirably long time.

Bioreactors typically require multiple pumps, one to supply groundwater to the bioreactor and another to return the groundwater to the contamination zone. Bioreactors also tend to clog up with biomass as the biomass grows in the bioreactor. Electrically operated mixing devices are typically employed to break up the biomass colonies as they enlarge. Bioreactors employing multiple pumps and electrically operated mixers are expensive, require maintenance, and have not been entirely satisfactory.

An object of the present invention is to provide an improved process and bioreactor apparatus for enhancing the rate and efficiency of bioremediation in contaminated soil and ground water using naturally occurring biological media.

SUMMARY OF THE INVENTION

In accordance with the present invention, bioremediation is achieved by extracting ground water from a ground water recovery well in a contamination site, passing and recirculating the ground water through a special fully pressurized fluidized bed bioreactor, and reintroducing the ground water back into the contamination site. The bioreactor serves several purposes. It provides a highly desirable environment for culturing and accelerating the growth and development of native microorganisms carried to the bioreactor from the contamination zone by the ground water. The ground water is treated by the microorganisms while in the bioreactor. In addition, the bioreactor causes biomass developed in the bioreactor to be reintroduced into the contamination zone in returning ground water in a highly desirable finely dispersed form, which permits the biomass to pass through the fluidized bed of the bioreactor and the outlet filter and well screen and penetrate the soil in the contamination zone. The biomass is broken up and finely dispersed by a pump driven nozzle that drives the biomass through a recirculation loop while at the same time strongly agitating and breaking up the biomass and dislodging it from the particulate solid materials to which it is attached.

The ground water and finely dispersed biomass, supplemented with nutrients and oxygen during treatment, are reintroduced into the contamination zone, where the microorganisms continue to proliferate. The environment in the contamination zone is further enhanced by sparging or otherwise introducing oxygen containing gasses in the contamination zone. Vapor extraction removes gasses and volatilized hydrocarbons from the contamination site.

An automatic control system provides remote computer monitoring of system operation and remote adjustment of flow rates as necessary.

This treatment process and apparatus produce an enhanced rate of remediation of biodegradable organic compounds in a contamination zone that compares favorably with other methods and apparatus used previously.

These and other features and advantages of the present invention will become apparent from the embodiments described in detail below and shown in the appended drawings.

DESCRIPTION OF PREFERRED EMBODIMENTS

Figure 1:
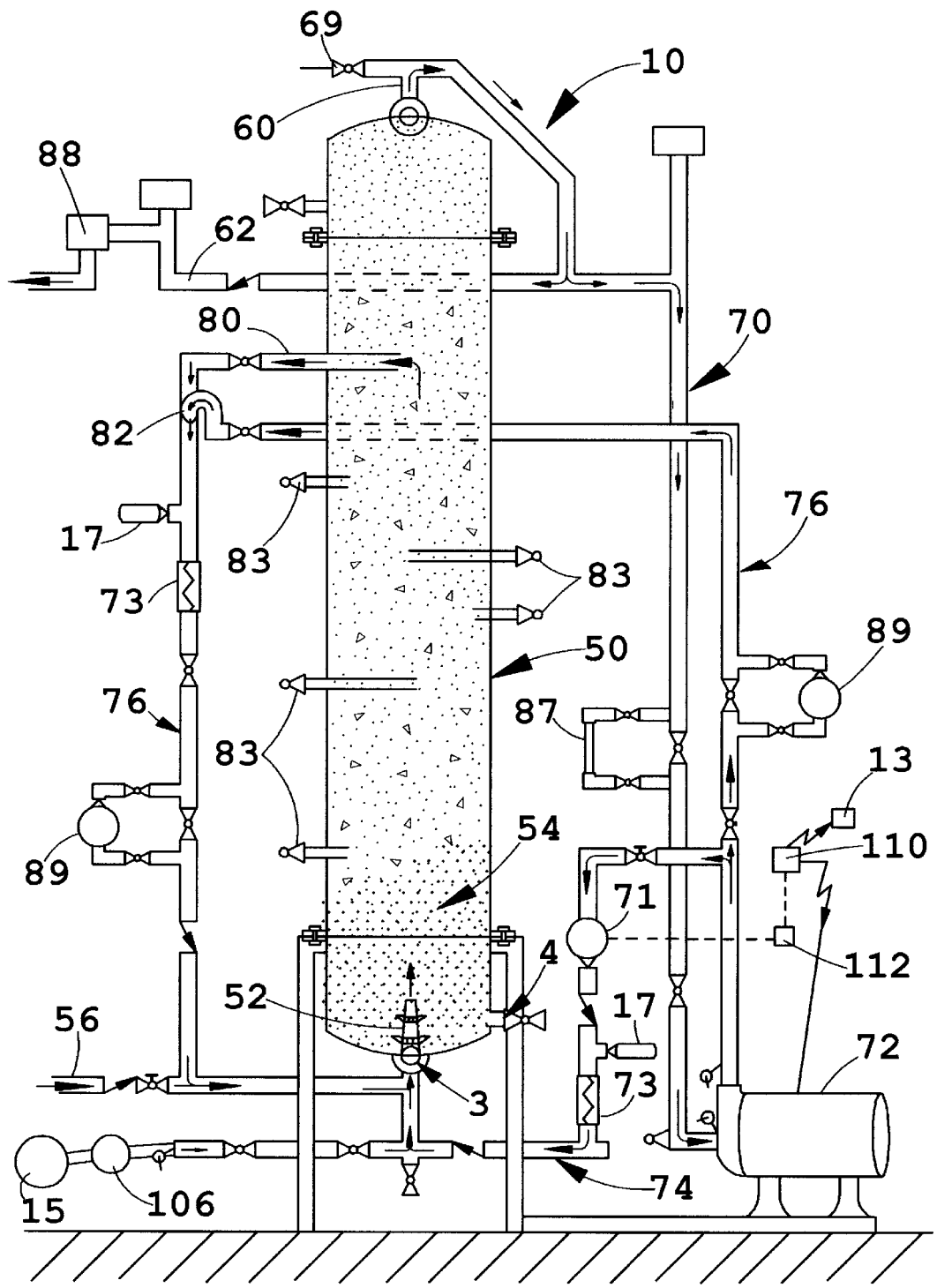
FIG. 1 is a cross-sectional schematic view of a bioreactor of the invention.
Figure 5:
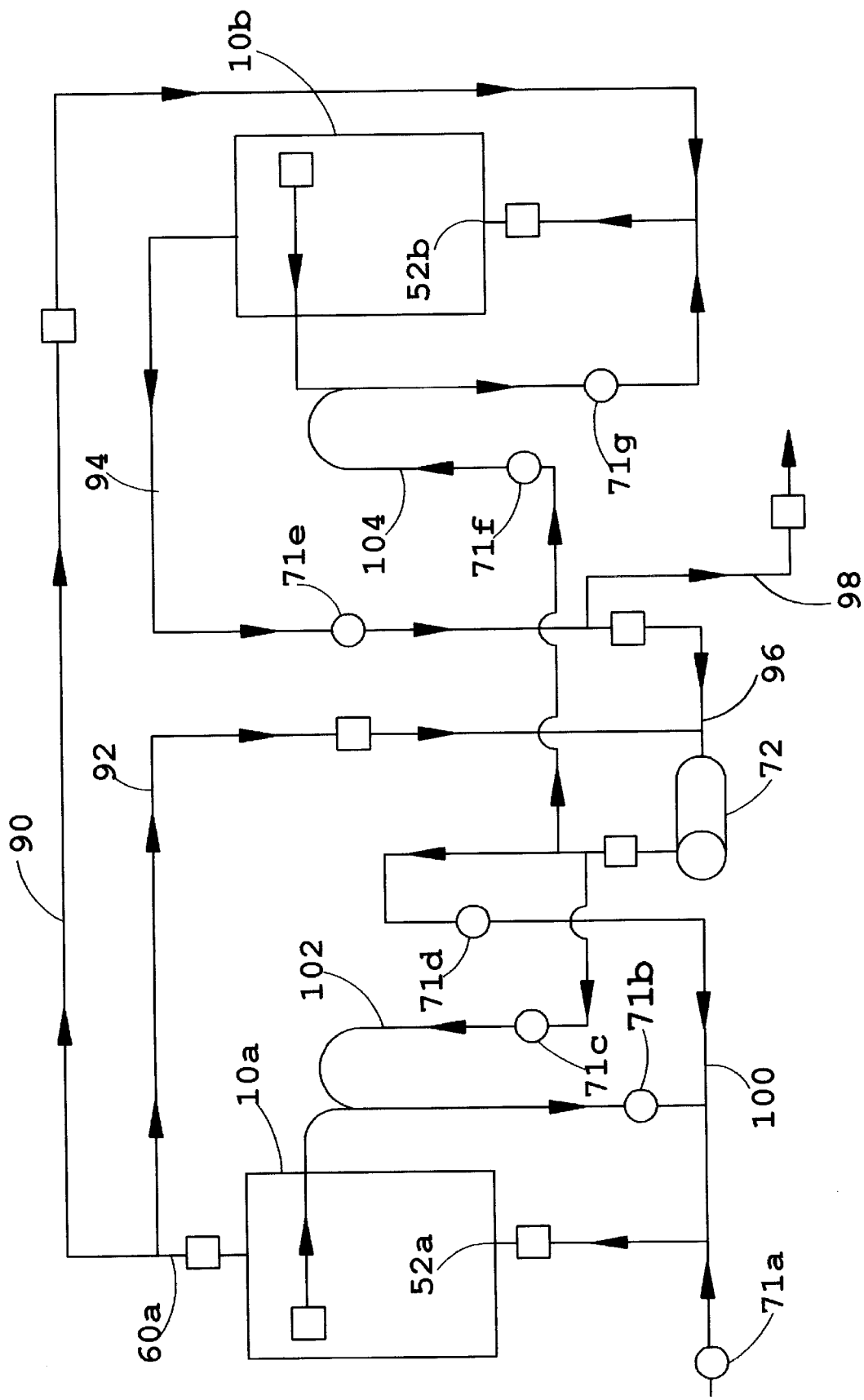
FIG. 5 is a schematic view showing two interconnected bioreactors in accordance with the present invention.
Figure 6:
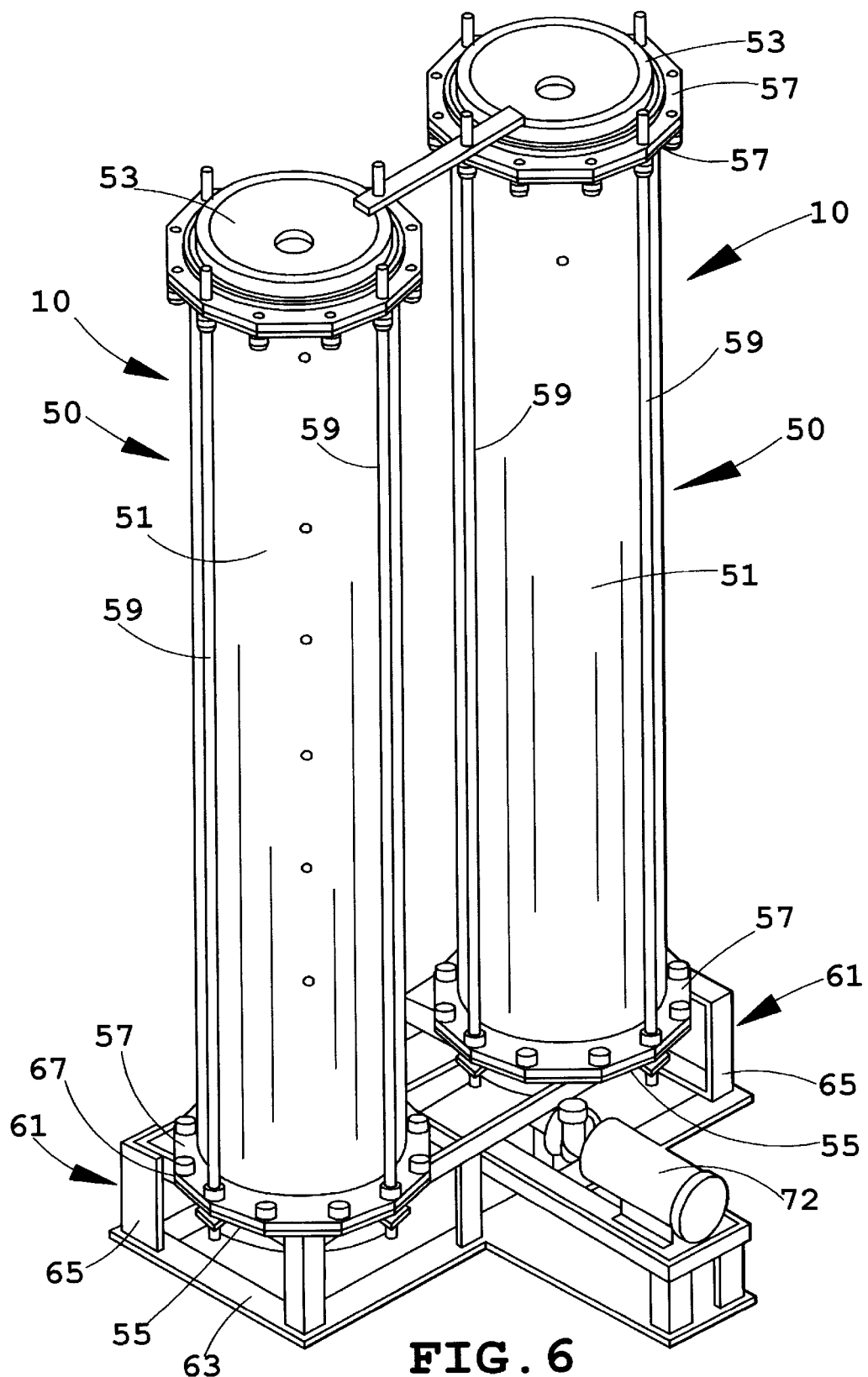
FIG. 6 is an isometric view of two bioreactors of the present invention mounted in a support frame, with the conduit interconnections being omitted for clarity.

A preferred embodiment of a bioremediation system of the invention is generally shown in the drawing figures and includes an array of ground wells (FIGS. 2–4) and at least one bioreactor 10 (FIG. 1). As shown in FIGS. 5 and 6, two or more bioreactors can be employed in the system, with the bioreactors being connected in parallel, in series, or in a combination of both.

Figure 2:
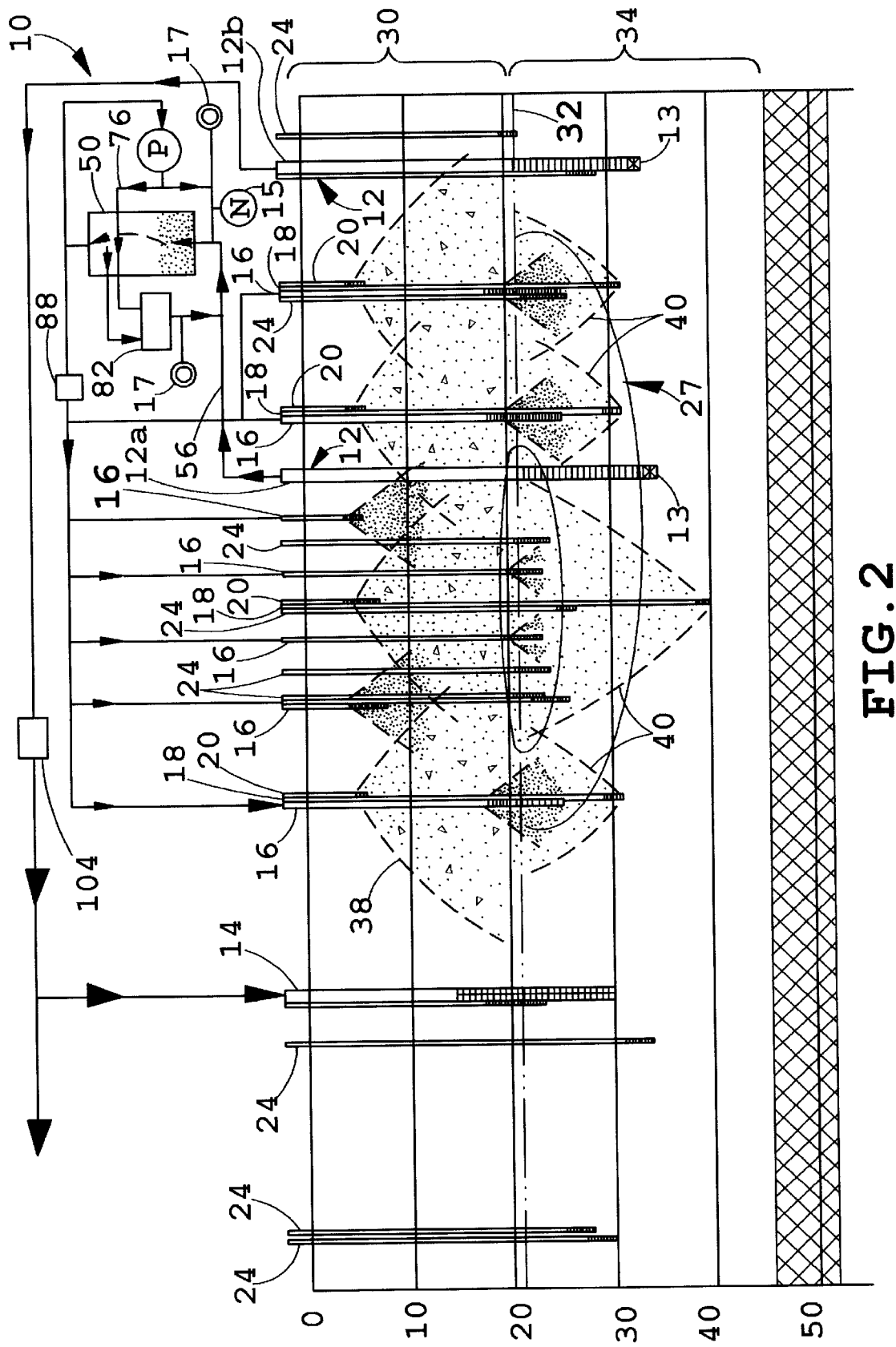
FIG. 2 is a cross-sectional schematic view of a bioremediation system of the invention installed at a sample ground and ground water contamination site.
Figure 3:
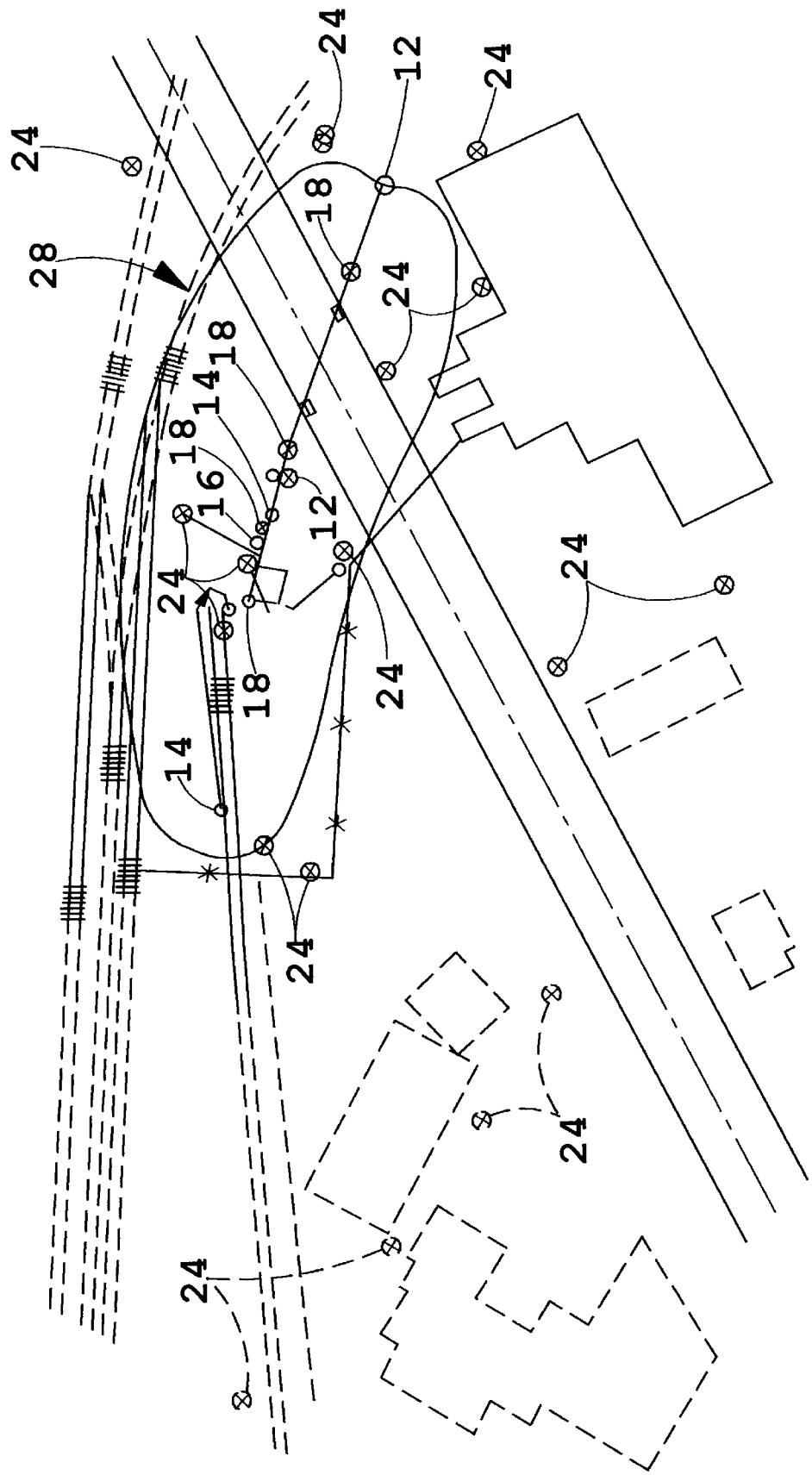
FIG. 3 is a schematic plan view of the installation of FIG. 2.
Figure 4:
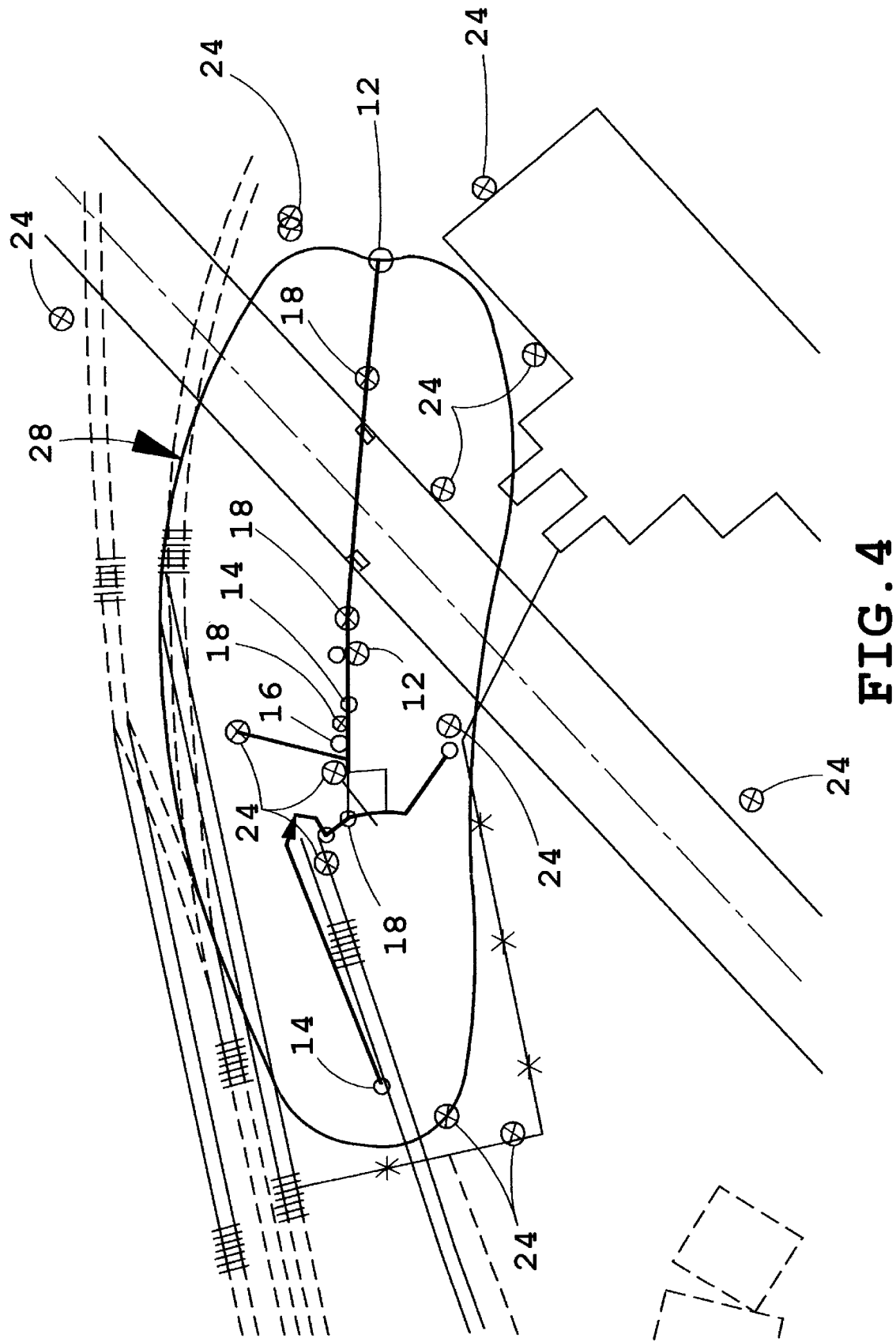
FIG. 4 is an enlarged detail of the targeted remediation area of FIG. 3.

The array of wells shown in FIGS. 2–4 includes at least one each of a ground water recovery well 12, a ground water injection well 14, a nutrient injection well 16, a passive air sparge well 18, and a soil vapor extraction well 20. An array of monitoring wells. 24 also is used to establish the size and other characteristics of the contamination site and to monitor the progress of remediation. The specification for each well is dependent upon the circumstances of each contamination site, as will be understood by one skilled in the art.

The passive air sparge wells 18 are injection wells that are drilled through the vadose zone 30 to a depth below the water table 32 and, thus, into the aquifer 34. Passive sparge wells are primarily used to oxygenate the ground water and promote biosparging, but they also serve to strip volatile contaminants from the ground water and deliver them to the vapor extraction wells above the aquifer. The soil vapor extraction wells 20 may correspond to the air sparge wells 18, but will have shallower depths to cast a cone of influence that will extend at least beyond the area affected by the corresponding air sparge wells 18.

Similar to the soil vapor extraction wells 20, an array of nutrient injection wells 16 is located in the area of heaviest contamination in the targeted remediation site 28. This area is referred to herein as the primary contamination zone and generally corresponds with the zone of estimated distribution of dissolved phase hydrocarbons 27, as shown in FIG. 2. This area also is referred to as the primary bioactive zone, which is the area in which the bioremediation efforts are primarily focussed. As will be discussed below, nutrients that are conducive to the propagation of indigenous microorganisms are injected through the nutrient injection wells 16 along with treated ground water to encourage the propagation of indigenous microorganisms that will facilitate the bioremediation.

An array of ground water recovery wells 12 is also provided, with a well pump 13 associated with each well 12 to pump the ground water out of the targeted remediation area 28. Pumps 13 are conventional submersible pumps and are located at lower portions of the wells. In the illustrated embodiment there are two ground water recovery wells 12a and 12b. Well 12a is located directly in the primary contamination zone, while well 12b is located at the down-gradient edge of the primary contamination zone. As shown in FIG. 2, the ground water from well 12b, which is cleaner than ground water from well 12a, is not passed through the bioreactor but is filtered with a mechanical filter 104, such as granular activated carbon, and reintroduced directly back into the ground through a ground water injection well 14 located above the up-gradient edge of the primary contamination zone. This assures that untreated water that drifts down-gradient from the primary contamination zone is returned to the treatment area for treatment. A portion can be discharged as surface water in order to maintain an hydraulically closed loop system for the aquifer. Water from recovery well 12a is considerably more contaminated than water from well 12b. This water is first treated in bioreactor 10 and then reintroduced in the primary contamination zone through nutrient injection wells 16 along with nutrients added from source 15.

The bioreactor 10 (FIGS. 1 and 6) is a fully pressurized, fluidized bioreactor that has a single chamber pressure vessel 50 with a generally cylindrical configuration and a longitudinal axis that is oriented generally vertically. The reactor 10 may be constructed of any of various, suitable materials, including metals or plastics, preferably PVC. The particular specifications of the reactor 10, including, but not limited to its material, diameter, height, and the thickness of the reactor walls, will depend upon the circumstances of the specific remediation site installation. Some of the factors that may affect the specifications of the reactor 10 may include the number of ground water wells required and the flow rate of each well, the number of reactors 10 desired, the expected duration of the remediation process, life-cycle characteristics of indigenous microorganisms at a specific remediation site, operating pressure, and operating flow volume, for example, as will be understood by one skilled in the art. The reactor 10 may commonly operate at a pressure of about five to fifty pounds per square inch, but this is not a limitation on the concept of the invention. The vessel should be able to withstand an internal pressure of 65 to 85 psi or more.

Each bioreactor 10 comprises an elongated cylindrical sidewall 51 capped at opposite ends by end caps 53 and 55. The end caps are mounted on the ends of the sidewall by mating peripheral flanges 57 that are bolted together. Tie rods 59 extend between the flanges at opposite ends and are bolted thereto. A typical bioreactor may be about eight feet high and have a diameter somewhat less than two feet.

Each bioreactor is mounted in an elevated position on a rectangular frame 61, which engages and is attached to the lower flanges. The frame comprises a base 63, corner legs extending upwardly from the base, and upper support members 67 mounted on the legs that engage and support the vessel. The frame may be constructed to support two or more bioreactors, as shown in FIG. 6.

A distribution header 52 is positioned in the bottom of the pressure vessel 50, in a fluidized bed portion 54 of the bioreactor 10. Intake piping 56 connects the bioreactor 10, and more particularly the header 52, with the ground water recovery well 12a, in fluid communication.

The fluidized bed 54 may include particulate solids such as volcanic cinders, glass or plastic beads, silica particles, or activated carbon, for example, as will be understood by one skilled in the art. The particulate solid materials serve both to absorb hydrocarbons and to act as a host matrix for microorganisms, where the particles provide a surface area for attachment and growth of biomass colonies in the reactor.

An outlet 60 is provided at the top of the vessel 50 for discharge of treated ground water to the nutrient injection wells 16, through discharge piping 62. A manual air bleed valve 69 at outlet 60 permits release of air from the bioreactor.

As thus far described, then, one will understand that only the ground water recovery well pump 13 is required to pump the ground water from the recovery well 12a through intake piping 56, through distribution header 52, through the fully pressurized, fluidized bioreactor 10, through discharge piping 62, and into the nutrient injection wells 16. That is, the ground water is removed, treated, and returned, with only the action of the ground water recovery well pump.

The bioreactor 10 is also provided with a recirculation loop 70 and a recirculating fluidization pump 72 that recirculate a portion of the water from the outlet 60 and reintroduce that water into the bioreactor intake 56 through one of two branches. In a first branch 74, a portion of recirculated water is conducted directly to the distribution header 52. This assures a water flow rate through the reactor sufficient to maintain a fluidized condition in the fluidized bed 54. This recirculation flow will also dilute the incoming ground water and will return contaminant specific microorganisms to the fluidized bed 54.

In addition to recirculating a portion of the treated water to fluidize the fluidized bed 54, as in the first branch 74, a second branch 76 of the recirculation loop 70 includes a biomass extraction port 80 and syphon venturi/biomass shearing nozzle 82. The biomass extraction port 80 penetrates the pressure vessel 50 at a location that is about two-thirds of the height of the pressure vessel 50 from the distribution header 52. The syphon and shearing nozzle 82 is specifically adapted to provide both syphoning of the biomass-covered particulate solids from the pressure vessel 50 and biomass shearing. This action creates an homogenous mixture of recirculated ground water, sheared biomass, and particulate solids that are cleaned of attached biomass. This homogenous stream is then returned to the distribution header 52 and the fluidized bed 54. A shearing nozzle that has been particularly satisfactory is a product called a "convertible ejector". In particular, a product sold by a company named Flint & Walling as a deep well ejector for a four inch pipe has been used satisfactorily in the present invention.

The reason for the second branch of the recirculation loop is that as biomass develops in the fluidized bed the microorganisms first attach to the particulate solid materials in the bed and then multiply in colonies that cling together. As the colonies enlarge, the aggregate density of the particulate solid material and attached biomass becomes less, and the biomass tends to rise up in the fluidized bed. Unchecked, the biomass would eventually rise to the top of the reactor, clogging the reactor, and would pass out of the outlet in large colonies or clumps, carrying with it the particulate solid materials from the fluidized bed. Moreover the large biomass particles would clog the bioreactor outlet filter and the well screen (a screen at the bottom of a well designed to keep subsurface soil out of the well) and would not migrate with the ground water through the soil.

The second recirculation loop and the shearing nozzle alleviate these problems. When the biomass enlarges to the point where it rises up to the top third of the bioreactor, it is withdrawn from the bioreactor through the biomass extraction port along with the attached particulate solid material. The biomass is then subjected to violent pressure drop in by the shearing nozzle venturi. This cleans the biomass from the particulate solid materials and also breaks up the biomass colonies and reduces the biomass to fine particles having a particle size of less than fifty microns and generally about fifteen microns or less. These particles pass readily through the outlet filter (which typically has a pore size of about fifty microns) and the well screen and migrate easily through the soil with the ground water returned to the contamination site. The dispersed biomass and cleaned particulate solid materials are delivered by the recirculation loop to the bioreactor inlet. From there a majority of the fine biomass particles pass through the fluidized bed without substantial reattachment to particulate materials. The particulate solid materials, being heavier, remain in the bottom of the fluidized bed until new microorganisms become attached to the solids and grow to the point where the particulate solids and attached biomass start to rise up in the chamber.

Thus, with the nozzle recirculation mechanism, the chamber is continually cleaned of biomass build-up, a desirable fine biomass is created and passed through the chamber and reintroduced to the contamination site, and the particulate materials remain in the reactor for reuse for an indefinite time, all without the expense of additional pumps to produce this result.

Other components of the bioreactor recirculation loop are a sight valve 87 upstream of the pump inlet and visual flow meters 89 in both branches of the loop. Both branches 74 and 76 of the loop also include oxygen feed meters 17 that inject oxygen in metered amounts into the recirculating water. Static mixers 73 are positioned downstream of the oxygen injection locations to mix the oxygen with the water. Nutrients are added to the ground water at the inlet to the bioreactor by a pump 106 that supplies a metered flow of nutrients from a source 15.

The present invention also provides for off-site monitoring and control by computer 110 through a modem 112 (shown schematically in FIG. 1). A computer monitored flow meter 71 in the first branch of the recirculation loop transmits flow information to the computer 110. This information is used to control the speed of well pump 13 which is a variable speed pump, so as to control the flow rate through the bioreactor. Fluidization pump 72 also may be a variable speed pump controlled by the computer controls, although this may not be necessary in all cases.

Another feature of the reactor vessel is the inclusion of a number of sampling ports 83 at various elevations in the tank. Each sampling port has a normally closed shut-off valve that can be opened periodically to sample the reactor contents at different positions in the reactor.

One manner in which two or more bioreactors may be connected together is shown in FIG. 5. The inlet header 52*a* of bioreactor 10*a* is connected to the intake piping 56. Outlet 60*a* is connected through one conduit 90 to the inlet header 52*b* of bioreactor 10*b*. A recirculation loop 92 extends from outlet 60*a* of bioreactor 10*a* to fluidization pump 72. Bioreactor 10*b* has an outlet conduit 94 that is connected to a recirculation line 96 connected to the pump inlet. Line 94 also is connected to outlet conduit 98 which delivers a portion of the treated ground water back to the treatment site in the manner described above. The pump 72 delivers a portion of the recirculated water directly back to header 52*a* of bioreactor 10*a* through conduit 100. The remainder of the recirculated water is transmitted to shearing nozzle loops 102 and 104 for bioreactors 10*a* and 10*b*, which operate as described above. Computer monitored flow meters 71*a*–71*g* may be used in the various conduits as shown in order to enable offsite computer monitoring and control. From the information available from the computer monitored flow meters, the computer can calculate the flow rates at the locations labeled "CF" in FIG. 5. Other methods for connecting multiple bioreactors can be employed for specific applications.

In practice, the location, size, and configuration of a remediation site is determined with a through a series of samples taken from monitoring wells 24. Once the site specifics are determined, a layout of ground water recovery wells 12, ground water injection wells 14, nutrient injection wells 16, air sparge wells 18, and soil vapor extraction wells 20 is developed, and the wells are placed accordingly, as will be understood by one skilled in the art. An oxygenated gas is pumped into the air sparge wells 18 and resulting vapors are extracted through soil vapor extraction wells 20.

With analysis of specimens from the monitoring wells 24, indigenous microorganisms are identified. More particularly, appropriate nutrients to enhance the natural biological activities of indigenous microorganisms are identified. The appropriate nutrients are then supplied to the ground water along with oxygen before it is passed through the bioreactor. A commonly used nutrient is ammonium polyphosphate.

In operation, ground water is extracted through the ground water recovery well 12*a* and pumped to the bioreactor 10 through intake piping 56. The recovered ground water passes through distribution header 52 and enters the fluidized bed 54 of pressure vessel 50. Additional flow through distribution header 52 is provided from one or both of the recirculation branches 74 and 76. Among other benefits this assures an appropriate flow through distribution header 52 to maintain fluidization of the fluidized bed 54. For an example, assume that bioreactor 10 requires a flow of forty-six gallons per minute (46 gpm) through distribution header 52 to fluidize the fluidized bed 54. Further, assume that the flow of recovered ground water through intake piping 56 is ten gallons per minute (10 gpm). The difference of thirty-six gallons per minute (36 gpm) must then be accommodated by the recirculation loop 70 with a combined flow through branches 74 and 76 totaling the deficit thirty-six gallons per minute (gpm).

With a forty-six gallon per minute (46 gpm) flow through distribution header 52, an eight gallon per minute (8 gpm) flow through biomass extraction port 80 may be induced with a eight gallon per minute (8 gpm) flow through the venturi/shearing nozzle 82, resulting in sixteen gallons per minute (16 gpm) of flow into intake piping 56 from the recirculation loop second branch 76. Given the thirty-six gallon per minute (36 gpm) flow required above for the recirculation loop 70, this means that the first recirculation branch 74 must then provide a flow of twenty gallons per minute (20 gpm). Moving further up the recirculation loop 70, the combined flows of the first and second branches 74 and 76, respectively, will require a twenty-eight gallon per minute (28 gpm) flow into the recirculation loop 70 from the outlet 60. Finally, balancing the inflow of forty-six gallons per minute (46 gpm) at the distribution header 52, the outflow of eight gallons per minute (8 gpm) through the biomass extraction port 80, and a total flow of twenty-eight gallons per minute (28 gpm) through the recirculation loop 70, results in a ten gallon per minute (10 gpm) flow through the discharge piping 62 to the nutrient injection wells 16. This ten gallon per minute (10 gpm) flow out of bioreactor 10 to the nutrient injection wells 16 exactly matches the ten gallon per minute (10 gpm) flow into bioreactor 10 from the ground water well 12a. Clearly, then, the fully pressurized bioreactor 10 of the invention makes it possible to remove the ground water through ground water recovery wells 12, treat the ground water, and return treated water to the ground through nutrient injection wells 16 with only the action of the ground water recovery well pumps, contrary to previously known bioremediation systems that require additional pumps to return the treated ground water to the ground.

Another benefit of the present invention is the automatic and continuous reinjection of contaminant degrading organisms to the subsurface by continuously reintroducing dispersed biomass produced by the shearing nozzle. This action creates a subsurface condition known as enhanced in situ bioremediation, which is desirable.

A further benefit of the fully pressurized bioreactor 10 is that the biological reduction of the contaminants, and hydrocarbons in particular, appears to occur faster than in previously known unpressurized bioreactors. It is theorized that the pressurized environment of the bioreactor 10 may work as a sort of force feeding of the microorganisms, enhancing the rate of diffusion of hydrocarbons through the cell walls of the microorganisms and increasing their consumption in comparison with other previously known bioreactors in which clustered microorganisms must draw the nutrients in through their cell walls.

It will be understood by those who practice the invention and by those skilled in the art, that various modifications and improvements may be made without departing from the spirit of the disclosed concept. The scope of protection afforded is to be determined by the claims and by the breadth of interpretation allowed by law.

I claim:

1. A bioremediation apparatus comprising:
    a pressurizable bioreactor, said bioreactor having an inlet and an outlet and said apparatus further including a pump operatively connected between said outlet and said inlet to recirculate treated liquid through an external recirculation loop from said outlet back to said inlet, said bioreactor also having an extraction port having an inlet in communication with an interior of the bioreactor at a position between the inlet and outlet thereof, the extraction port having an outlet that is operatively connected with the recirculation loop, the apparatus further including a venturi/shearing nozzle at a junction between the outlet of the extraction port and the recirculation loop, such that pump-induced liquid flow through said venturi/shearing nozzle produces a syphon-induced flow of liquid from said reactor through said extraction port and back to the reactor inlet; and
    a pump operatively connected between a source of contaminated liquid and said bioreactor to pump the liquid from the source and through said bioreactor under pressure.

2. The apparatus defined in claim 1, wherein said extraction port is positioned in relation to the bioreactor such that the venturi/shearing nozzle syphons enlarged biomass colonies attached to particulate solids from the extraction port and shears the biomass from the particulate solids and breaks up the biomass sufficiently that the sheared biomass is of a size conducive to injection through a bioreactor outlet into a subsurface primary bioactive zone through an injection well.

3. The apparatus defined in claim 2, wherein the sheared biomass predominantly has a particle size of less than fifty microns.

4. The apparatus defined in claim 2, wherein the sheared biomass predominantly has a particle size of about fifteen microns or less.

5. The apparatus of claim 2 wherein the pump-driven venturi/shearing nozzle causes a continuous extraction of biomass from the bioreactor and a continuous shearing of the biomass into fine particles, and the pump that pumps liquid through the bioreactor, therefor connected to an injection well leading to a primary bioactive zone, causes a continuous reinjection of the sheared biomass into the primary bioactive zone through the injection well, thus making available in the primary bioactive zone a continuous repopulation of contaminant specific degrading organisms that enhance in situ bioremediation.

6. The apparatus of claim 5 and further comprising a nutrient injector connected to the apparatus so as to deliver nutrients to the liquid upstream of the inlet to the bioreactor.

7. The apparatus of claim 5 and further comprising an oxygen injector connected to the apparatus so as to deliver oxygen to the liquid as it is being conveyed to the inlet to the bioreactor.

8. The apparatus of claim 5 and further comprising a computer monitored control system wherein flow rates can be monitored and controlled remotely by computer.

9. The apparatus of claim 2 wherein the bioreactor is a fluidized bed bioreactor comprising a pressure chamber at least partially filled with particulate solid materials and having an inlet at a lower portion of the chamber and an outlet at an upper portion of the chamber, the extraction port being positioned in an upper portion of the bioreactor such that enlarged biomass colonies that rise up in the bioreactor are withdrawn from the bioreactor and subjected to shearing in the venturi/shearing nozzle before they reach the bioreactor outlet.

10. The apparatus of claim 9 wherein the extraction port is located about two-thirds of the way from the bioreactor inlet to the outlet.

11. An in situ bioremediation apparatus comprising:

a recovery well;

an injection well;

a bioreactor connected in fluid communication between said recovery well and said injection well, said bioreactor having an inlet and an outlet and said apparatus further including a pump operatively connected between said outlet and said inlet to recirculate treated liquid through an external recirculation loop from said outlet back to said inlet, said bioreactor further including an extraction port having an inlet in communication with an interior of the bioreactor at a position between the inlet and outlet thereof, the extraction port having an outlet that is operatively connected with the recirculation loop, the apparatus further including a venturi/shearing nozzle at a junction between the outlet of the extraction port and the recirculation loop, such that pump-induced liquid flow through said venturi/shearing nozzle produces a syphon-induced flow of liquid from said reactor through said extraction port and back to the reactor inlet; and a pump operatively connected with said recovery well to pump a fluid from said recovery well, through said bioreactor, and into said injection well, said bioreactor being a pressurizable vessel that is pressurized by the pump, such that supplying fluid under pressure to the bioreactor through an inlet urges fluid to flow out of a bioreactor outlet to the injection well.

12. A method of in situ bioremediation comprising the steps of:

providing a recovery well;

providing an injection well;

providing a pressurizable bioreactor and connecting said bioreactor in fluid communication between said recovery well and said injection well;

providing said bioreactor with an inlet and with an outlet and further providing said apparatus with a pump operatively connected between said outlet and said inlet to recirculate treated liquid through an external recirculation loop from said outlet back to said inlet;

further providing said bioreactor with an extraction port and providing said extraction port with an inlet in communication with an interior of the bioreactor at a position between the inlet and outlet thereof, the extraction port having an outlet that is operatively connected with the recirculation loop, further providing the apparatus with a venturi/shearing nozzle at a junction between the outlet of the extraction port and the recirculation loop, such that pump-induced liquid flow through said venturi/shearing nozzle produces a syphon-induced flow of liquid from said reactor through said extraction port and back to the reactor inlet; and providing a pump and operatively connecting said pump with said recovery well to pump a fluid from said recovery well, through said bioreactor, and into said injection well.

* * * * *

UNITED STATES PATENT AND TRADEMARK OFFICE
CERTIFICATE OF CORRECTION

PATENT NO. : 5,985,149
DATED : November 16, 1999
INVENTOR(S) : Raetz, Richard M.

It is certified that error appears in the above-identified patent and that said Letters Patent is hereby corrected as shown below:

Column 2, line 65, "monitoring wells. 24" should be - - monitoring wells 24 - -.

Column 8, line 38, "therefor" should be - - when - -.

Title page, col. 2, above the Abstract,

"Waters and Morge, P.C." should be - - Waters and Morse, P.C. - -.

Signed and Sealed this

Twenty-seventh Day of February, 2001

Attest:

NICHOLAS P. GODICI

Attesting Officer

Acting Director of the United States Patent and Trademark Office